United States Patent [19]

Hume, III

[11] 4,427,744
[45] Jan. 24, 1984

[54] HEAT-ACTIVATED PRESSURE SENSITIVE ADHESIVE FOR BONDING LABEL STOCK TO PLASTIC FILM, METAL FOIL AND THE LIKE

[75] Inventor: Robert M. Hume, III, Cottage Grove, Minn.

[73] Assignee: H. B. Fuller Company, St. Paul, Minn.

[21] Appl. No.: 409,405

[22] Filed: Aug. 19, 1982

[51] Int. Cl.³ .................. B32B 15/08; C08L 93/00; C09J 5/02

[52] U.S. Cl. ................... 428/462; 428/497; 428/498; 428/512; 524/271; 156/309.9; 156/320; 156/334; 156/DIG. 21

[58] Field of Search .......... 524/271; 156/309.9, 156/334, DIG. 21; 428/462, 497, 498, 512

[56] References Cited

U.S. PATENT DOCUMENTS

| | | | |
|---|---|---|---|
| 2,462,029 | 2/1949 | Perry | 260/29.1 |
| 2,608,542 | 8/1952 | Smith et al. | 260/29.7 |
| 2,678,284 | 5/1954 | Holt, Jr. | 117/33 |
| 2,746,885 | 5/1956 | Holt, Jr. | 117/122 |
| 2,784,111 | 3/1957 | Davis | 117/63 |
| 2,885,306 | 5/1959 | Rigterink et al. | 117/122 |
| 3,082,108 | 3/1963 | Sirota | 106/186 |
| 3,104,979 | 9/1963 | Lawton et al. | 106/178 |
| 3,154,428 | 10/1964 | Cochrane et al. | 117/122 |
| 3,165,421 | 1/1965 | Pollti | 117/33 |
| 3,203,093 | 9/1965 | Hansen | 15/506 |
| 3,386,846 | 6/1968 | Lones | 117/11 |
| 3,447,954 | 6/1969 | Lohse | 117/122 |
| 3,540,580 | 11/1970 | Columbus | 206/63.2 |
| 3,788,876 | 1/1974 | Baker et al. | 117/38 |
| 3,988,275 | 10/1976 | Satake et al. | 260/23 R |
| 4,037,016 | 7/1977 | Habeck et al. | 428/349 |
| 4,049,483 | 9/1977 | Loder et al. | 156/230 |
| 4,057,522 | 11/1977 | Naruse et al. | 260/28.5 AS |
| 4,061,835 | 12/1977 | Poppe et al. | 428/522 |
| 4,091,195 | 5/1978 | Vitek et al. | 526/52 |
| 4,097,649 | 6/1978 | Neumann | 428/327 |
| 4,121,956 | 10/1978 | Sample | 156/80 |
| 4,135,033 | 1/1979 | Lawton | 428/344 |
| 4,248,748 | 2/1981 | McGrath et al. | 260/27 R |
| 4,289,811 | 9/1981 | Shelley | 427/239 |

FOREIGN PATENT DOCUMENTS

| | | |
|---|---|---|
| 0042357 | 6/1981 | European Pat. Off. |
| 2623178 | 2/1977 | Fed. Rep. of Germany |
| 543634 | 12/1973 | Switzerland |
| 911821 | 11/1962 | United Kingdom |
| 1092499 | 11/1967 | United Kingdom |

OTHER PUBLICATIONS

Homuth et al. "Inhalt" vol. 8, pp. 895-898.

*Primary Examiner*—H. S. Cockeram
*Attorney, Agent, or Firm*—Merchant, Gould, Smith, Edell, Welter & Schmidt

[57] ABSTRACT

A heat-activated pressure-sensitive adhesive which comprises an aqueous emulsion of finely divided solids comprising a rubber polymer, a resin and a plasticizer, which optionally contains urea, a urea-compound and/or a polyhydroxy compound in the aqueous phase. Substrates such as plastic film, metal foil and cigarette paper may be effectively bonded.

21 Claims, No Drawings

HEAT-ACTIVATED PRESSURE SENSITIVE ADHESIVE FOR BONDING LABEL STOCK TO PLASTIC FILM, METAL FOIL AND THE LIKE

FIELD OF THE INVENTION

The invention relates to a composition that can be applied onto a substrate to form a non-adhering coating, which when heated to an elevated temperature attains substantial pressure-sensitive adhesive characteristics.

BACKGROUND OF THE INVENTION

Adhesive compositions used in conjunction with heat are old in the art. Heat sealing compositions have been used in the past to adhere a substrate to a surface or object, for example, one sheet of paper to another, a sheet of paper to a solid object, or a sheet of paper to a film, under the combined action of heat and pressure. However, heat-sealing compositions are not satisfactory for many adhesive uses, since in many applications it is difficult to simultaneously heat both the adhesive, the substrate and the object or surface to which the substrate is to be attached.

Heat-activated adhesive compositions have been developed which can be applied to a substrate in a thin non-tacky film, can be heat-activated and can remain activated or tacky for a period of time after activation. The advantage of heat-activated adhesives is that when heated the coating becomes tacky and remains tacky even after the coating cools. Large quantities of the substrate coated with the non-activated adhesive can be stored at room temperature in intimate contact without substantial adhesion, and release liners used with many tacky pressure-sensitive adhesives are unnecessary.

Heat-activated adhesive compositions are commonly applied to a substrate with high speed automatic machines. To maximize production, the films of adhesive must form rapidly and must dry quickly so the adhesive-substrate combination can be stored without adhesion. Further, the films must be formed in thin layers without void spaces lacking adhesive or localized excesses of adhesive.

The adhesive-substrate combination is commonly applied using rapid automatic machine application of the heated, activated adhesive-substrate combination to a surface or an object. The machine obtains the adhesive-substrate combination, heats it to activate the adhesive and rapidly applies it to the desired location. The adhesive must have reproducible heat activation properties and must activate quickly and uniformly. After heat activation, it is preferable that the pressure-sensitive adhesive have a controlled open time. In other words, the adhesive properties of the activated adhesive should remain present for a specific period of time. For certain applications, it is desired that the pressure-sensitive adhesive properties remain present for about 10 to 60 seconds or up to about 30 minutes, however for other applications it is important for the pressure-sensitive properties to remain for up to 8 to 10 hours or 72 to 96 hours.

In many applications of the adhesive-substrate combination such as the adhesion of price tags to goods in stores, it is desirable that the labels be essentially unremovable from packages. Packages of meats and other expensive commodities often have a price tag or label and the removal of the label and the substitution of another having a lower price is clearly undesired. If the strength of the adhesive bond resulted in the destruction of either the label or the package, the label could not be replaced. The destruction of the label can occur either causing the paper of the label to tear or causing a part of the film or object to which the label is applied to remain strongly attached to the label.

BRIEF DISCUSSION OF THE INVENTION

We have found a substantially improved heat-activated pressure-sensitive adhesive having a controlled blocking point, an elevated activation point, a controlled open time, and a strong adhesive bond. Non-adhering films of the heat-activated pressure-sensitive adhesive can be cast from an aqueous emulsion of solids comprising an aqueous phase and a solid phase comprising finely divided particles of a rubber, a rosin compound, and a plasticizer, wherein each of the solid components are mutually incompatible at ambient temperatures. When elevated to heat activation temperatures, the solids form a mutual solution which exhibits the adhesive properties as long as the components are in intersolution. The combination of the solid plasticizer with the two solid viscid components results in an adhesive having substantially improved adhesive properties when compared to an adhesive of one of the viscid components and the plasticizer. If after a certain period of time the activated adhesive is not contacted with a surface the individual components can crystallize, separate and the adhesive properties can disappear. If the activated adhesive is contacted with a surface or object a strong adhesive bond is formed in which the adhesive interacts with the surface. The surface interaction substantially prevents any reversion of the activated adhesive into the separate solid components. The interaction can be primarily a surface effect. However components of the adhesive can also chemically interact with the surface. For example, the plasticizer can migrate from the adhesive into the surface material, forming a plasticized surface, and an adhesive bond that extends deeply into the object.

We have also found that by including in the aqueous phase of the adhesive emulsion an effective amount of urea or urea-compound to plasticize the fibers in the label, the label becomes more susceptible to destruction during an attempt to remove the label from the package. While we do not wish to be held to a theory of action of the urea-plasticizer, it appears to reduce the strength of hydrogen bonds between the cellulose fibers in the label which increases the fragility of the label, promoting its destruction. Further, urea appears to aid in controlling open time by interfering with the recrystallization of the components of the adhesive film.

Further, we have found that the ability to form a uniform coating of an adhesive emulsion on a substrate is improved by the presence of an effective amount of a polyfunctional alcohol. The polyfunctional alcohol results in the smooth application of a continuous coating of the adhesive, free from void spaces or over-accumulations and also appears to result in the lubrication of the coating process.

One specific application of aqueous adhesive emulsions of this invention is the attachment of a filter to a cigarette using a tip paper coated with adhesive. In the past filter tips have been added to cigarettes by wrapping tip paper coated with an aqueous adhesive around both the filter and a part of the cigarette that abutts the filter. Generally, the tip paper is coated with an aqueous adhesive that dries and bonds after the filter is attached.

We believe that the filter tipping of cigarettes can be improved using the heat activated adhesive of this invention. Tip papers can be coated with the adhesive emulsion of this invention, the water can be easily removed and the coated tip papers can be stored until use. The tip papers can then be used to attach the filter by activating the tip paper-adhesive and wrapping the tip paper around at least part of the cigarette and filter. There is no need to apply an aqueous adhesive before the tipping operation or to dry the bonded tipped cigarette. The heat activated adhesive can also be used in such applications as contact paper, and the application of labels to polystyrene prescription drug vials.

The novel heat activated adhesives form superior adhesive bonds, have high blocking points, activate quickly at activating temperatures, have improved fiber debonding properties and are available in an easily applied aqueous emulsions or dispersion which dries rapidly to a matt semi-translucent finish. While we do not wish to be limited to a theory of action of the components, it appears that the improved properties result from the fact that the solid components are substantially mutually incompatible or mutually insoluble at ambient temperature, and do not substantially interact physically until heated. When heated the solid plasticizer melts and the appearance of the adhesive can change from a matt to a gloss finish. The first visual change however does not indicate the activation of the adhesive. At a somewhat more elevated temperature the other solid components begin to interact with the plasticizer to form an intersolution. The resin and rubber appear to function in unexpected ways. Ordinarily the rubber component is tackified by the resin, and thus provides adhesion. Surprisingly, in the adhesive coatings of this invention it appears that the resin provides adhesion while the rubber increases the tack of the resin and provides the firm bonding of the unactivated adhesive film to the substrate.

The adhesive of the invention can also be used as a heat sealing adhesive.

DETAILED DESCRIPTION OF THE INVENTION

Briefly, the improved adhesive composition of this invention comprises an aqueous emulsion of a rubber, a resin, and a plasticizer.

Natural and synthetic rubbers (elastomers) which are polymeric materials possessing characteristic elastic properties can be used as one solid component of the adhesive emulsion. Commercially important rubbers are natural rubber and a considerable number of synthetic rubbers. Natural rubbers are produced from the latex of rubber-yielding plants by a series of steps comprising coagulation, washing, sheeting out and drying. Synthetic rubbers such as styrene-butadiene rubber (SBR, formerly GR-S), stereo rubber, nitrile rubber, butyl rubber, neoprene rubber, polyurethane rubbers, and others can be used. Synthetic rubbers basically fall into one of two broad classes, condensation polymers such as polyurethanes, and addition polymers such as styrene-butadiene rubbers or butyl rubbers. Synthetic rubber polymers can be produced by bulk solution or emulsion polymerization.

Preferred rubbers for use in the heat-activated pressure-sensitive adhesive of this invention comprise a polymeric styrene-butadiene rubber. The rubber can be obtained as a finely divided solid or in the form of an aqueous latex emulsion wherein the rubber contains about 15 to 60 wt-% styrene, the balance being butadiene, and wherein the emulsion contains about 40 to 80 wt-% solids and optionally an emulsifier. Most preferred rubbers comprise commercially available carboxylated styrene-butadiene rubber latex emulsions such as Polysar Latex 987, Polysar Latex 731, and Polysar Latex 680.

Rosin Compounds

Rosins useful in the invention may be derived from well known resinous natural products and are generally thermoplastic, resinous, room temperature solids. Naturally occurring resinous materials typically comprise complex ethylenically unsaturated mixtures of relatively high molecular weight organic acids and related neutral materials which can be polymerized to form useful polymerized rosins. Wood rosins or other modified forms of such naturally occurring rosins, for example hydrogenated or esterified rosins (or rosin polymers) are particularly useful. Polymers including terpene, pinene, etc. or styrene monomers are also useful.

The preferred form of the rosin compounds comprises an aqueous emulsion of the rosin optionally containing an emulsifier, or a finely divided solid. Preferred rosin compounds include polymerized rosin and polymerized rosin esters prepared from polyhydroxy alcohols such as ethylene glycol, propylene glycol, glycerine, 1,4-butanediol, etc. such as Dressinol 215 or Dressinol 155. The article *Rosin and Rosin Derivatives*, pp 475-508 Vol. 17, *Encyclopedia of Chemical Technology* which is a general discussion of production, derivation modification and use of rosin and rosin derivatives, is hereby incorporated by reference herein.

Plasticizers

Plasticizers particularly useful for initiating the heat-activated pressure-sensitive properties of the adhesive are normally solid plasticizing compounds at room temperature. A preferred class of plasticizers includes phthalate ester plasticizers having cyclic, aromatic or aliphatic substituents. The cyclic substituents can include cyclobutyl, cyclopentyl, cyclohexyl, cyclooctyl, cyclohexenyl, cyclooctenyl, methylcyclohexyl, ethylcyclohexyl, phenyl, ethylphenyl, etc. Preferred plasticizers, for reasons of economy, high melting point, and ease of use preferably comprise dicyclohexylphthalate and diphenylphthalate. The preferred form of use of the plasticizers is a finely divided solid state or an emulsion or dispersion of the finely divided solids in an aqueous medium optionally stabilized with an emulsifier. Emulsions of the plasticizer can contain from about 10 to about 90 wt-% solids. Dicyclohexyl phthalate plasticizers are available commercially as Unimoll 66 M from Mobay Chemical Company.

Urea

Urea and urea compounds such as thiourea and N-substituted urea compounds can be used in the aqueous phase of the adhesive emulsion of this invention. The urea appears to have two functions. First, the urea appears to affect the open time of the adhesive by interfering in the recrystallization and separation of the individual adhesive components. Accordingly, the addition of some urea tends to extend the open time of the adhesive. Further, the urea appears to plasticize the cellulose fibers of paper sheet stock upon which the adhesive is coated. The plasticized cellulose tends to be substantially weaker than nonplasticized cellulose labels. An attempt to remove the plasticized labels containing the composition of this invention, is more likely to be ruined in a removal procedure than uncoated labels.

Polyhydroxy Alcohol

Polyhydroxy alcohol compositions are useful in the aqueous emulsion compositions of this invention to improve the application of the coatings of the adhesive. Useful polyhydroxy alcohols include liquid or semi-liquid compounds having 1–6 hydroxy groups on a carbon atom backbone having about 1–12 carbon atoms. An effective amount of a polyhydroxy alcohol, for example, ethylene glycol, glycerine (1,2,3-trihydroxypropane), propylene glycol, 1,4-butane diol, etc. can substantially improve the rate of formation, and the uniformity of the coatings of the adhesive. The liquid polyhydroxy compound appears to reduce the friction between applicator and substrate and also appears to alter the rate the adhesive flows from the applicator, resulting in a more uniform, constant film free of void spaces and undesirable accumulations.

The presence of additives such as urea, a urea compound and/or a polyhydroxy compound in the adhesive composition can also improve cleanup of the adhesive. Adhesive containing urea compound or polyhydroxy compound is easily removed from surfaces of application machines, floors, etc. upon which it is spilled. The presence of one of the additives in the adhesive prevents caking, skinning and skimming of quantities of the aqueous adhesive during exposure of the aqueous system to the air. The additives also aid in control of drying time of the film of aqueous adhesive and aids in control of leveling the aqueous adhesive film. The mechanical stability of the dry adhesive coating is improved by the presence of the additives.

In somewhat greater detail the heat-activated pressure-sensitive adhesives of this invention can be made by forming an aqueous emulsion of the solids in an aqueous medium which can contain dissolved therein the polyhydroxy compound and/or the urea. Emulsion preparation is well known and any conventional method can be used for forming the adhesive emulsions of this invention. The solids components can be purchased in emulsion form and can be combined at proper ratios to form the final adhesive emulsion. Alternatively, the solids can be purchased in bulk dry form in a variety of particle sizes, which can then be milled to appropriate particle sizes and then suspended in aqueous media in the presence of emulsifying agents if needed. Alternatively, bulk solids can be suspended in aqueous media and milled until the solids particles attain the proper size for emulsion formation.

Urea or polyhydroxy alcohol compound can be added to the aqueous phase at any convenient time. Addition can be made to the finished emulsion, to emulsions of the individual solids, or to the aqueous media before the solids are added. A preferred method for forming the adhesive of the invention is to combine emulsions of the rubber, emulsions of the resin, with finely divided solid particles of the plasticizer and then add the aqueous phase soluble urea or polyhydroxy compound to the formed emulsion composition.

Total solids content of the adhesives of this invention can comprise from about 10 to 75 parts by weight per each 100 parts by weight of the total aqueous emulsion. Generally, the solids concentration will be from about 55 to 75 parts by weight per each 100 parts by weight of the aqueous composition, and preferably about 65 to 75 parts by weight per 100 parts by weight of the aqueous composition.

The ratio of solid components in the solid phase of the aqueous emulsion comprises at least 100 parts of the rosin compound, at least 150 parts of the solid plasticizer each per 100 parts of the rubber solids, preferably there are about 250 to 750 parts of the rosin compound and 250 to 750 parts of the solid plasticizer, and most preferably, about 400 to 650 parts of rosin compound, about 400 to 600 parts of the solid plasticizer each per 100 parts of rubber solids for reasons of strong adhesive bond, high blocking point and reproducible activation temperature.

The aqueous phase contains dissolved therein an effective cellulose fiber plasticizing amount of urea or urea compound, and an effective amount of the polyhydroxy compound to promote film formation. The effective amount of urea or polyhydroxy compound comprises about 0.01 to 1000, preferably 1 to 250 and most preferably 25 to 500 parts of urea or polyhydroxy compound per 100 parts of rubber in the emulsion.

The adhesive composition of this invention may be applied to any substrate which is compatible with a heat-activated adhesive coating. Flexible and rigid materials including metals such as iron, steel, copper, brass, aluminum, chromium, nickel, glass, porcelain, other ceramics, plastics, wood, textiles, fabrics, leather, paper, cardboard, etc. can benefit from the heat-activated adhesives of this invention. It is to be understood that the sheet material containing the adhesive coating must be easily heated to activate the adhesive. Substrates with substantial bulk or substrates made from materials with low heat conduction or high heat capacity would reduce the ease of activation of the adhesive films, thus rendering the adhesive composition less useful in the application. Preferably, sheet materials used with the heat-activated adhesive are flexible, thin webs such as paper label stock having a thickness of about 0.1 to 10 mils, preferably about 5.0 mils, cardboard sheet stock, plastic films, and the like are preferred.

The aqueous adhesive emulsions can be applied to the substrate by any conventional technique such as roll coating, casting, brushing, dipping, spraying, etc. The coated substrate can be heated to a temperature below activation temperature or can be held at ambient temperature for a sufficient period of time to drive off water. The dispersed solids form a coating of separate very small particles on the surface of the sheet which becomes a flat, dull semi-translucent coating. After the water has been driven off, the coated sheet can be stacked and stored without a removable release liner to prevent blocking between sheets. Commonly storage temperatures can be well tolerated by the heat-activated adhesive of this invention. However, some care must be exercised to avoid placing the adhesive compositions of the invention in storage for extended periods of time at temperatures substantially greater than about 140° F. (60° C.).

Once activated the adhesive-substrate combinations can be applied to a variety of surfaces including paper, wood, cardboard, metal, plastic, etc. A preferred surface comprises a thin film of transparent or semitransparent plastic wrap comprising polymers of ethylenically unsaturated monomers such as ethylene, propylene, vinyl chloride, vinylidene chloride, styrene and the like. Most preferred films include polyvinylvinylidene chloride having a thickness of about 0.2 to 1.0 mil, N-polyethylene such as linear or linear low density polyethylene having a thickness of about 0.2 to 1.0 mil.

In order to activate the adhesive of this invention, the adhesive film must be raised to a temperature between about 200°–400° F. (93°–236° C.). At these temperatures, the solid plasticizer melts. The molten plasticizer, the resin, and the rubber form an intersolution in which each of the components are solutes. The adhesive film changes from a non-adhering coating of discrete finely divided particles of the components into a substantially single phase uniform solution of each of the components. After the coating cools, it remains substantially adhesive for an extended period of time until the individual components crystallize, separate into discrete finely divided particles, and the adhesive properties disappear.

Preferably, the heat-activated adhesive of this invention used in automatic machines which heat and apply the adhesive substrate to surfaces or objects automatically at high rates of label attachment. Preferably, sheet stocks used in this application are labels which can be imprinted using automatic printing machines having such information as weight, price per pound, and total price of the unit.

The composition may be pigmented if desired. For pigmenting purposes, there may be incorporated into the composition a pigment, delustrant or the like such that the weight ratio of the total adhesive solids to pigment is about 20–1:1, depending upon the particular effect desired. Suitable pigments include titanium dioxide, ultramarine blue, zinc oxide, zinc sulphate, barium sulfate, calcium carbonate, zinc chromate, carbon black, etc. If not pigmented the adhesive films attain a dull matt translucent finish.

The following Examples and test data are illustrative of the invention and should not be construed to limit the scope of the invention.

The tests referred to in the Examples and Tables below were carried out with about 4–20 pounds of adhesive per ream (3,000 sq. ft.) of paper label stock as follows:

To measure the initial blocking temperature (Table I) in degrees Fahrenheit, two paper label stock coupons coated with the adhesive having dimensions of 1"×3"×5 mil, placed with coated sides in contact are heated at increasing 5° F. increments using a sentinal heat sealer under pressures of 20 lbs. per square inch gauge for 6 seconds. The coupons are separated and the temperature at which the coupons begin to adhere is the initial blocking temperature. A suitable blocking point is about 125° F. and a preferred initial blocking point is about 130° F. or higher.

The freezer peel point (Table 1) of the adhesive is measured by applying a 1"×3"×5 mil paper label stock coupon having the coating of the invention applied to a shrink film at 300° F. under 20 psig for 1 second. Samples are placed in a freezer compartment overnight. While samples are maintained in the −20° F. freezer at the low temperature, the coupon is pulled at a 180° angle from the shrink wrap. The labels are rated from 4 which indicates film tear or paper tear to 0 which indicates no adhesion at all. The values represent an average of 4 repetitions. A desirable result is one which has substantial film (FT) or paper tear (PT).

To measure the 180° peel test (Table 2), coupons are applied to shrink film exactly as in the −20° F. freezer test, except the labels remain at ambient temperatures overnight. Samples were placed on the 180° peel tester and force was applied such that the label was removed, at a rate of 12 inches per minute. The results are reported in one of two ways. First, there is a report of whether there is film (FT) or paper tear (PT), and a percentage of film or paper tear. Second, values of peel force (in lbs.) needed to remove the coupon from the shrink film are reported. Film or paper tear is a desired result and the peel force can be used to compare adhesives.

To measure the polyken probe tack test (Table 3), the strength of the adhesive after activation is measured. Coated 5 mil paper label stock coupons prepared similar to the −20° F. freezer test are prepared and are activated by contact of the uncoated side with the heated surface maintained at 350° F. for 2 seconds. Test times refer to the interval between activation and contact with a surface to test for bond strength. Bond strength is measured in grams per square centimeter required to remove the label and are an average of 10 repetitions. The time interval indicates open time and the bond strength can be used to compare adhesives.

To measure the minimum heat seal temperature (Table 4), one inch wide samples coated with the adhesive of this invention are placed facing a shrink film. The samples are heated using a sentinal heat sealer at 20 lbs. per square inch at a temperature falling between 90 and 260° F. at 10° increments. After activation the bond strength is measured, 4 being optimum, 0 being no adhesion. Bonds strength can be used to compare adhesives.

Example I

Into a one-liter glass beaker equipped with a stirrer was placed 300 grams of an aqueous dispersion of a thermoplastic resinous material comprising about 40% by weight solids of a glycerol ester of polymerized rosin (Dressinol 155). Into the mixed dispersion was added 32.5 grams of an aqueous rubber latex having about 70 wt-% solids comprising a carboxylated styrene-butadiene rubber comprising 31 wt-% styrene and 69 wt-% butadiene (POLYSAR LATEX 680). The mixture of resin and rubber was mixed until uniform and 155 grams of dicyclohexylphthalate (DCHP) was added slowly at a rate such that the solid quickly dispersed into the emulsion. Into the smooth dispersion of rubber, resin and plasticizer was added an additional 2.5 grams of water and 10.0 grams of urea which quickly dissolved in the aqueous phase.

Example II

Example I was repeated with 307.69 gms of the rosin dispersion, 33.35 gms of rubber latex, and 158.96 gms of the plasticizer, except that the urea was omitted.

Example III

The procedure of Example I was repeated with 245 gm of rosin dispersion, 29.0 gm of rubber latex, 133 gms of DCHP, 3 gms of water and 90 gms of urea.

Example IV

The procedure of Example I was repeated except that 32.5 gms of an aqueous latex having 70 wt-% solids comprising a carboxylated styrene-butadiene rubber (POLYSAR LATEX 731), was substituted for the POLYSAR LATEX 680.

Example V(a)

The procedure of Example I was repeated except that 32.5 gms of an aqueous rubber latex having 50 wt-% solids comprising a carboxylated styrene-butadiene having 58 wt-% styrene and 42 wt-% butadiene (POLYSAR LATEX 987), was substituted for the POLYSAR LATEX 680.

Example V(b)

The procedure of Example V(a) was repeated with 293 gms of the resin dispersion, 44.5 gms of the rubber latex, 151.5 gms of DCHP, 1.25 gms of water and 9.75 gms of urea.

Example VI

The procedure of Example I was repeated with 270 gms of the resin dispersion, 29.25 gms of the rubber latex, 139.5 gms of DCHP, 2.25 gms water and 9 gms of urea, except that 50 gms of glycerine (1,2,3-trihydroxypropane) were also added after the urea, which quickly dissolved in the aqueous phase.

Example VII

The procedure of Example II was repeated with 350 gms of the resin dispersion, 75 gms of the rubber latex, and 75 gms of DCHP.

Example VIII

The procedure of Example II was repeated with 350 gms of the resin dispersion, 150 gms of DCHP, except that the rubber latex was omitted.

Example IX

The procedure of Example VIII was repeated with 200 gms of the resin, 200 gms of the DCHP and 100 gms of water.

Example X

The procedure of Example II was repeated with 250 gms of the resin dispersion, 125 gms of the rubber latex, and 125 gms of DCHP.

Example XI

The procedure of Example II was repeated with 250 gms of the resin dispersion, 225 gms of the rubber latex, and 50 gms of DCHP.

Example XII

The procedure of Example II was repeated with 195 gms of the resin dispersion, 45 gms of the rubber latex, 195 gms of DCHP, and 65 gms of water.

Example XIII

The procedure of Example II was repeated with 175 gms of the resin dispersion, 175 gms of the rubber latex, and 150 gms of the DCHP.

Example XIV

The procedure of Example II was repeated with 125 gms of the resin dispersion, 250 gms of the rubber latex, and 125 gms of the DCHP.

Example XV

The procedure of Example II was repeated with 108.5 gms of the resin dispersion, 108.5 gms of the rubber latex, 217.5 gms of the DCHP and 65.5 gms of water.

Example XVI

The procedure of Example II was repeated with 350 gms of the resin dispersion and 150 gms of the rubber latex, except that the DCHP was omitted.

Example XVII

The procedure of Example XVI was repeated with 450 gms of the resin dispersion, and 50 gms of the rubber latex.

Example XVIII

The procedure of Example XVI was repeated with 250 gms of the resin dispersion, and 250 gms of the rubber latex.

Example XIX

The procedure of Example II was repeated with 350 gms of the rubber latex, and 150 gms of DCHP, except that the resin dispersion was omitted.

Example XX

The procedure in Example XIX was repeated with 125 gms of rubber latex, 125 gms of DCHP and 250 gms water.

Example XXI

The procedure of Example XIX was repeated with 75 gms of rubber latex, 175 gms of DCHP, and 250 gms water.

Example XXII

The procedure of Example XIX was repeated with 15 gms of rubber latex, 135 gms of DCHP and 350 gms water.

TABLE 1

Adhesive Composition
Blocking Temperature Test; −20° F. Freezer Peel Test

| | RAW MATERIALS SOLIDS RATIO* | | | | | BLOCK TEMPERATURE °F. | FREEZER PEEL | | |
|---|---|---|---|---|---|---|---|---|---|
| | | | | | | | 0.5 Mil Polyvinyl-Vinylidene Chloride Film | Lot #1-0.6 Mil Polyethylene Film | Lot #2 0.6 Mil Polyethylene Film |
| Ex. | Rubber | Rosin | Plasticizer | Urea | Glycerine | | | | |
| I | 100 | 527 | 681 | 44 | — | 130 | 4.0 FT** | 2.0 | 2.0 |
| II | 100 | 527 | 681 | — | — | 130 | 4.0 FT | 2.0 | 2.0 |
| III | 100 | 483 | 655 | 443 | — | 135 | 4.0 FT/PT** | 3.0 | 2.0 |
| IV | 100x | 527 | 681 | 44 | — | 125 | 4.0 PT/FT | 3.0 | 3.0 |
| V(a) | 100y | 738 | 954 | 62 | — | 130 | 4.0 | 3.0 | 3.0 |
| V(b) | 100y | 527 | 681 | 44 | — | 130 | 3.5 | 2.5 | 2.5 |
| VI | 100 | 527 | 681 | 44 | 244 | 130 | 4.0 FT | 2.0 | 2.0 |
| VII | 100 | 267 | 143 | — | — | 110 | 4.0 PT | 2.5 | 2.0 |
| VIII | — | 100 | 107 | — | — | *** | 1.5 | 1.0 | 2.0 |
| IX | — | 100 | 250 | — | — | *** | 4.0 FT | 2.0 | 2.0 |

TABLE 1-continued

Adhesive Composition
Blocking Temperature Test; −20° F. Freezer Peel Test

| | RAW MATERIALS SOLIDS RATIO* | | | | | BLOCK TEMPERATURE °F. | FREEZER PEEL | | |
|---|---|---|---|---|---|---|---|---|---|
| Ex. | Rubber | Rosin | Plasticizer | Urea | Glycerine | | 0.5 Mil Polyvinyl-Vinylidene Chloride Film | Lot #1-0.6 Mil Polyethylene Film | Lot #2 0.6 Mil Polyethylene Film |
| X | 100 | 114 | 143 | — | — | 120 | 4.0 PT | 3.0 | 3.0 |
| XI | 100 | 57 | 32 | — | — | 90 | 4.0 PT/FT | 3.0 | 3.0 |
| XII | 100 | 248 | 619 | — | — | 135 | 4.0 FT | 3.0 | 3.0 |
| XIII | 100 | 57 | 122 | — | — | 90 | 4.0 PT | 3.0 | 3.0 |
| XIV | 100 | 29 | 71 | — | — | 90 | 4.0 PT | 3.25 PT | 3.0 |
| XV | 100 | 57 | 286 | — | — | 120 | 4.0 FT/PT | 3.0 | 3.0 |
| XVI | 100 | 133 | — | — | — | 100 | 3.0 | 3.0 | 3.0 |
| XVII | 100 | 514 | — | — | — | 150 | 2.0 | 2.0 | 2.0 |
| XVIII | 100 | 57 | — | — | — | 90 | 3.5 FT | 2.0 | 2.0 |
| XIX | 100 | — | 61 | — | — | 120 | 4.0 FT/PT | 3.0 | 3.0 |
| XX | 100 | — | 143 | — | — | 125 | 4.0 PT | 4.0 PT | 3.25 PT |
| XXI | 100 | — | 333 | — | — | 140 | 4.0 FT/PT | 3.0 | 3.0 |
| XXII | 100 | — | 1286 | — | — | 140 | 1.0 PT | 3.0 PT | 2.5 PT |

*parts by weight (dry basis) calculated to compare at 100 parts by weight of rubber
**FT = film tear PT = paper tear
***as temperature increases tack decreases

TABLE 2

Room Temperature 180° Peel Test

| Example | 0.5 Mil Polyvinyl-Vinylidene Chloride Film | Lot #1-0.6 Mil Polyethylene Film | Lot #2 0.6 Mil Polyethylene Film |
|---|---|---|---|
| I | 94% PT, 4.5# | ***75% PT, 1.0# | 100% PT |
| II | 100% FT | 50% PT, 2.5# | 75% PT, 3.5# |
| III | 2.9# | 100% PT | 100% PT |
| IV | 25% FT 2.3# | 44% PT | 82% PT |
| V(a) | 0.9# | 0.6# | 0.6# |
| V(b) | 25% FT 2.3# | 25% PT 1.9# | 25% PT 2.2# |
| VI | 25% FT, 2.7# | 100% PT | 50% FT/PT, 2.1# |
| VII | 100% FT | 0.3# | 0.2# |
| VIII | 25% PT, 0.5# | 0.35# | 0.2# |
| IX | 0.1# | 0.1# | 0.1# |
| X | 75% FT | 100% PT | 50% PT, 7.5# |
| XI | 100% PT | 100% PT | 100% PT |
| XII | 1.2# | 1.2# | 1.8# |
| XIII | 89% FT, 8# | 100% PT | 6.0# |
| XIV | 100% FT | 100% PT | 100% PT |
| XV | 12% FT, 3.7# | 25% PT, 1.9# | 25% PT, 2.7# |
| XVI | 81% FT, 8.5# | 0.2# | 0.2# |
| XVII | 100% FT/PT | 0.1# | 0.1# |
| XVIII | 100% FT | 0.4# | 0.45# |
| XIX | 25% PT, 1.8# | 0.25# | 0.1# |
| XX | 0.9# | 0.5# | 0.3# |
| XXI | 1.0# | 0.5# | 0.5# |
| XXII | 50% FT, 0# | 0.2# | 0.2# |

= lbs.
FT = film tear
PT = paper tear

TABLE 3

POLYKEN PROBE TACK TEST (g/cm₂)

| Example | Immediately | 1 Min. | 30 Min. | 1 Hour | 2 Hours | 4 Hours | 8 Hours | 24 Hours | 2 Days | 4 Days | 8 Days |
|---|---|---|---|---|---|---|---|---|---|---|---|
| I | 370 | 249 | 248 | 246 | 284 | 247 | 200 | 348 | 236 | 233 | 149 |
| II | 291 | 391 | 278 | 299 | 364 | 206 | 223 | 161 | 184 | 160 | 162 |
| III | 487 | 412 | 376 | 330 | 358 | 341 | 345 | 364 | 332 | 368 | 194 |
| IV | 248 | 281 | 315 | 260 | 270 | 273 | 259 | 322 | 354 | 337 | 229 |
| V(a) | 139 | 203 | 215 | 140 | 133 | 116 | 150 | 149 | 252 | 129 | 109 |
| V(b) | 215 | 212 | 227 | 187 | 191 | 201 | 218 | 228 | 192 | 172 | 114 |
| VI | 262 | 286 | 186 | 154 | 237 | 159 | 215 | 157 | 520 | 241 | 169 |
| VII | 1 | 8 | 37 | 0.5 | 0 | 2 | 12 | 0 | 0 | 0 | 0 |
| VIII | 8 | 84 | 76 | 41 | 83 | 102 | 31 | 13 | 2 | 0 | 2 |
| IX | 40 | 37 | 46 | 42 | 51 | 47 | 43 | 46 | 3 | 0 | 4 |
| X | 265 | 330 | 293 | 291 | 384 | 527 | 663 | 359 | 461 | 265 | 164 |
| XI | 32 | 34 | 74 | 45 | 61 | 54 | 65 | 33 | 0 | 18 | 4 |
| XII | 151 | 174 | 128 | 175 | 144 | 154 | 209 | 184 | 223 | 180 | 134 |
| XIII | 145 | 181 | 155 | 217 | 195 | 358 | 306 | 276 | 207 | 204 | 209 |
| XIV | 15 | 34 | 89 | 25 | 42 | 58 | 64 | 54 | 13 | 0 | 27 |
| XV | 128 | 130 | 57 | 139 | 33 | 205 | 206 | 129 | 27 | 0 | 7 |
| XVI | 0 | 0 | 0 | 0 | 0 | 0 | 0 | 0 | 0 | 0 | 0 |
| XVII | 0 | 0 | 0 | 0 | 0 | 0 | 0 | 0 | 0 | 0 | 0 |
| XVIII | 0 | 0.5 | 1 | 3 | 0 | 0 | 0 | 0 | 0 | 0 | 0 |
| XIX | 4 | 5 | 4 | 0 | 3 | 0 | 2 | 0 | 0 | 0 | 0 |
| XX | 0 | 0 | 12 | 0 | 0 | 0 | 0 | 0 | 0 | 0 | 0 |
| XXI | 17 | 24 | 59 | 36 | 19 | 8 | 28 | 0 | 0 | 0 | 0 |
| XXII | 1 | 1 | 0 | 5 | 9 | 0 | 0 | 0 | 0 | 0 | 0 |

TABLE 4

MINIMUM HEAT SEAL TEMPERATURE TEST °F.

| Example | 90 | 100 | 110 | 120 | 130 | 140 | 150 | 160 | 170 | 180 | 190 | 200 | 210 | 220 | 230 | 240 | 250 | 260 |
|---|---|---|---|---|---|---|---|---|---|---|---|---|---|---|---|---|---|---|
| I | 0 | 0 | 0 | 0 | 0 | 0 | 0 | 0 | 1 | 1 | 3.5 | 3.0 | 3.5 | 4.0 | 4.0 | 4.0 | | 4.0 |
| II | 0 | 0 | 0 | 0 | 0 | 0 | 0 | 0.5 | 3.5 | 4 | | 4 | | 4 | | 4 | | 4 |
| III | 0 | 0 | 0 | 0 | 0 | 0 | 0 | 0 | 2.5 | 4 | | 4 | | 4 | | 4 | | 4 |
| IV | 0 | 0 | 0 | 0 | 0 | 0 | 0 | 4 | 3.5 | 3 | | 4 | | 4 | | 4 | | 4 |
| V(a) | 0 | 0 | 0 | 0 | 0 | 0 | 0 | 0 | 3.0 | 4.0 | | 3.5 | | 4.0 | | 4.0 | | 4.0 |
| V(b) | 0 | 0 | 0 | 0 | 0 | 0 | 1.5 | 1.0 | 2.0 | 3.0 | 4.0 | 4.0 | 4.0 | 4.0 | 4.0 | 4.0 | 4.0 | 4.0 |
| VI | 0 | 0 | 0 | 0 | 0 | 0 | 0 | 0 | 1.0 | 4.0 | | 3.5 | | 4.0 | | 4.0 | | 4.0 |
| VII | 0 | 0 | 0 | 0 | 0 | 0 | 0 | 0 | 0 | 1.0 | | 1.0 | | 1.0 | | 1.0 | | 1.0 |
| VIII | 0 | 0 | 0 | 0 | 0 | 0 | 0 | 0 | 0 | 1.0 | | 1.0 | | 1.0 | | 1.0 | | 1.0 |
| IX | 0 | 0 | 0 | 0 | 0 | 0 | 0 | 0 | 0.5 | 1.0 | | 1.0 | | 1.0 | | 1.0 | | 1.0 |
| X | 0 | 0 | 1.0 | 1.0 | 1.0 | 1.0 | 0.5 | 1.0 | 1.0 | 4.0 | 4.0 | 3.0 | 4.0 | 4.0 | | 4.0 | | 4.0 |
| XI | 1.5 | 1.5 | 1.0 | 2.0 | 2.0 | 2.0 | 2.0 | 2.5 | 4.0 | 2.0 | 3.0 | 4.0 | 3.5 | 3.0 | 3.5 | 3.5 | 4.0 | 4.0 |
| XII | 0 | 0 | 0 | 0 | 0 | 0 | 0.5 | 1.0 | 2.5 | 3.0 | | 2.0 | | 2.0 | | 3.0 | 3.0 | 3.5 |
| XIII | 1.0 | 1.0 | 1.0 | 1.0 | 1.0 | 1.5 | 1.0 | 2.0 | 3.0 | 4.0 | 3.5 | 3.5 | 4.0 | 4.0 | | | | |
| XIV | 1.0 | 1.0 | 1.0 | 1.0 | 1.0 | 1.5 | 2.0 | 2.0 | 3.5 | 3.5 | | 2.5 | | 2.5 | 3.0 | 3.5 | 3.5 | 4.0 |
| XV | 0 | 0 | 0 | 0 | 0 | 0.5 | 0 | 1.0 | 1.0 | 3.5 | | 2.5 | | 3.0 | | 3.5 | 3.5 | 4.0 |
| XVI | 0 | 1.0 | 0.5 | 0.5 | 1.0 | 1.0 | 0 | 1.0 | 0 | 1.0 | | 0 | | 0 | | 1.0 | | 1.0 |
| XVII | 0 | 0 | 0 | 0 | 0 | 0 | 0 | 0 | 0 | 0 | | 0 | | 0 | | 0.5 | | 0.5 |
| XVIII | 1.0 | 1.0 | 1.5 | 1.5 | 1.5 | 1.5 | 2.0 | 2.0 | 2.0 | 1.5 | 1.5 | 1.0 | | 1.5 | | 1.5 | | 1.5 |
| XIX | 0 | 0 | 0 | 0.5 | 0 | 0 | 0 | 0 | 0 | 0.5 | 0.5 | 1.0 | | 1.0 | | 0.5 | | 1.0 |
| XX | 0 | 0 | 0 | 0 | 0 | 0 | 0 | 0 | 0 | 1.0 | | 1.0 | | 1.0 | | 1.0 | | 1.0 |
| XXI | 0 | 0 | 0 | 0.5 | 0 | 0 | 0 | 0 | 0 | 0 | 0.5 | 1.0 | | 1.0 | | 0 | | 0 |
| XXII | 0 | 0 | 0 | 0 | 0 | 0 | 0 | 0 | | | | 0 | | 0 | | 0 | | 1.0 |

Discussion of Tables

Table 1 shows the compositions made in Examples I–XXII and the results of the block temperature and freezer peel tests. The compositions having greater than 150 parts each of the plasticizer and the rosin per 100 parts of the rubber have blocking points above 120° F. The compositions with block points about 125°–130° F. all have excellent freezer peel point test results with film tear (FT) or paper tear (PT) in certain instances.

Table 2 shows the 180° peel test results. The compositions of Examples I–VI and X show the best overall performance on each wrapping material, while Examples VII–IX and XI–XXII had either poor performance on one or more of the wrapping materials or had a poor block point in Table 1.

Table 3 shows the polyken probe tack test results. A value of about 150 g/cm$^2$ is generally considered sufficient to pass the test. The compositions of Examples I–VI and X satisfy this standard. Except for Examples XII and XIII, Examples VII–IX and XI–XXII fail. However, Examples XII and XIII have low block points.

Table 4 shows the minimum heat seal temperature test results. Examples I–VI activate at temperatures greater than 150° F. and form strong bonds about 3.0–4.0. Examples VII–XXII either activate at low temperatures (90°–130° F.) to form a bond or exhibit insufficient bonding less than 3.0.

The Tables show that the combination of rosin and rubber is required to obtain preferred adhesive performance in the presence of the plasticizer (cf. Examples VIII and IX, no rubber, Examples XIX–XXII, no rosin, with Examples I–VI having the full complement of components).

The adhesive of Example I including urea performs in the adhesion tests as well as Example II without urea.

The foregoing detailed description of the invention has been made in general terms and with respect to several preferred embodiments. Many of the specific preferred materials, temperatures, and methods stated herein may be varied by persons skilled in the art without departing from the spirit and scope of this invention. Accordingly, the invention resides solely in the claims hereinafter appended.

We claim:

1. An aqueous adhesive composition which when heated to an activating temperature acquires pressure-sensitive properties, which comprises an emulsion having at least an aqueous phase and a solid phase, wherein the solid phase comprises finely divided particles, that are mutually incompatible at room temperature, of a rubbery polymer, at least about 100 parts of a rosin compound, and at least 150 parts of a plasticizer each per 100 parts of the rubbery polymer, and the aqueous phase comprises less than about 50 wt-% of the emulsion.

2. The adhesive composition of claim 1 wherein urea or a urea compound is present in the aqueous phase.

3. The adhesive composition of claim 2 wherein there are about 0.01 to 1000 parts of urea present in the aqueous phase per each 100 parts of rubbery polymer in the emulsion.

4. The adhesive composition of claim 1 wherein a polyhydroxy compound is present in the aqueous phase.

5. The adhesive composition of claim 4 wherein there are 0.01 to 1000 parts of the polyhydroxy compound present in the aqueous phase per each 100 parts of the rubbery copolymer in the emulsion.

6. The adhesive composition of claim 4 wherein the polyhydroxy compound is selected from a group consisting of ethylene glycol, propylene glycol and 1,4-butanediol.

7. The adhesive composition of claim 4 wherein the polyhydroxy compound comprises 1,2,3-trihydroxypropane.

8. The adhesive composition of claim 1 wherein the rubbery polymer comprises a styrene-butadiene rubber.

9. The adhesive composition of claim 8 wherein the styrene-butadiene rubber comprises a carboxylated styrene butadiene rubber having about 5 to 60 wt-% styrene.

10. The adhesive composition of claim 1 wherein the rosin comprises an ester of a polymerized natural rosin.

11. The adhesive composition of claim 10 wherein the ester of the polymerized natural rosin is an ethylene glycol ester.

12. The adhesive composition of claim 1 wherein the plasticizer comprises a phthalate diester.

13. The adhesive composition of claim 12 wherein the phthalate diester comprises dicyclohexyl phthalate.

14. An aqueous adhesive composition, which when heated to an activating temperature acquires pressure sensitive properties, which comprises an emulsion having at least a solid phase and an aqueous phase, the solid phase comprising finely divided particles of a styrene-butadiene rubber, about 250–750 parts of a glycerol ester of polymerized rosin, about 250–750 parts of dicyclohexylphthalate each per 100 parts of the styrene butadiene rubber and the aqueous phase comprising an aqueous solution containing about 25 to 500 parts of urea and 25 to 500 parts of glycerine each per 100 parts of rubber in the adhesive.

15. A substrate having a coating of discrete solid particles of a rubbery polymer, a rosin compound and a plasticizer on a substrate which comprises the product of the process of forming on a substrate a substantially continuous film of the adhesive composition of claims 1 or 14 and removing the water.

16. The substrate with a coating of claim 15 wherein the substrate comprises paper, metal foil, cardboard, or film.

17. The substrate having a coating of claim 16 wherein the paper comprises a cigarette tip paper.

18. A method of joining a substrate to a surface or object which comprises obtaining the substrate and coating of claim 15, heating the substrate for a sufficient period to an effective activating temperature to provide pressure sensitive properties and contacting the substrate with an object or surface.

19. The method of claim 18 wherein the surface comprises a transparent or semi-transparent plastic film having a thickness of 0.1 to 1.0 mil.

20. The product of the method of claim 18.

21. A method for filter tipping cigarettes which comprises contacting an end of a cigarette with a suitable filter and wrapping at least part of the cigarette and the filter with the heat activated tip paper of claim 17.

* * * * *